Patented Jan. 23, 1951

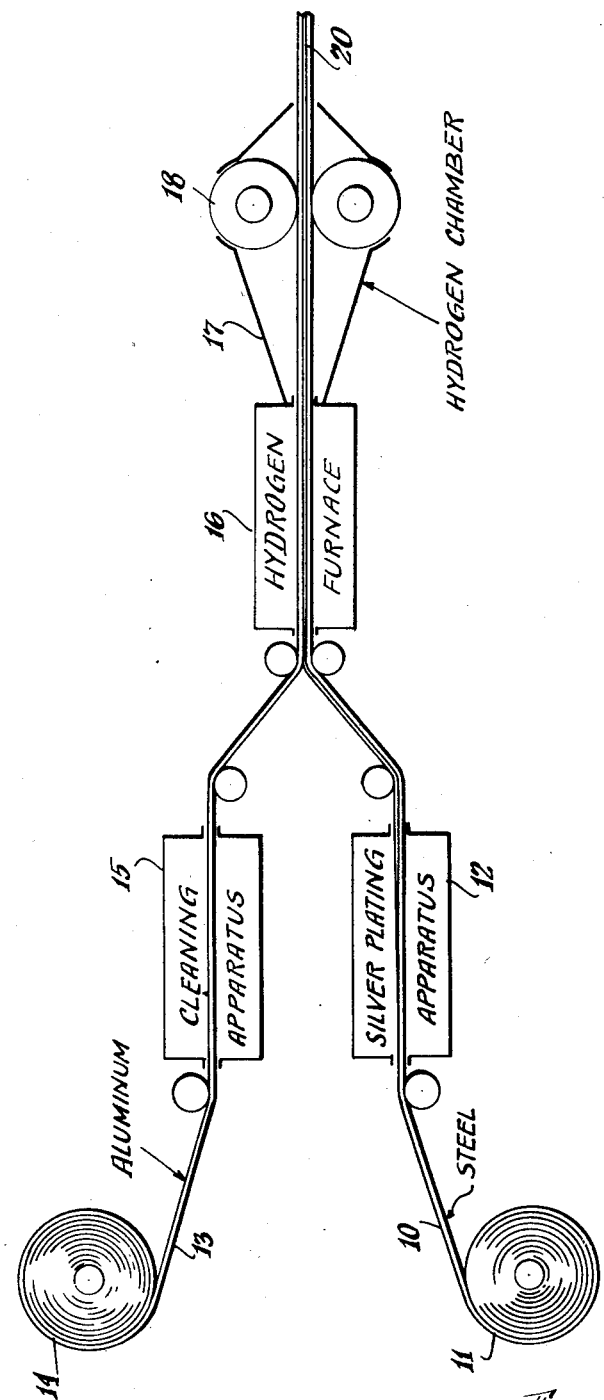

2,539,247

UNITED STATES PATENT OFFICE 2,539,247

METHOD OF BONDING ALUMINUM TO STEEL

Franz R. Hensel, Indianapolis, Ind., assignor to P. R. Mallory & Co., Inc., Indianapolis, Ind., a corporation of Delaware Application July 31, 1945, Serial No. 607,993

4 Claims. (Cl. 29—189)

This invention relates to the art of metal bonding, and, more particularly, to a novel method of permanently bonding layers of similar or dissimilar metals together, and to bimetals or overlay metals produced by such method.

The present application is a continuation-in-part of my co-pending applications Serial No. 557,703, filed October 7, 1944, and Serial No. 579,992, filed February 27, 1945, both of said applications being entitled Aluminum Clad Steel.

In the above-identified co-pending applications, I have disclosed that a strong, ductile and fatigue-resistant bond may be obtained between a layer of iron group metal and a layer of aluminum base metal by providing a bonding layer of silver between the two metals. One method of making overlay metals of the described character comprises bonding a layer of silver to the surface of the iron group metal and another layer of silver to the surface of the aluminum base metal and then bonding the layers together by heat and pressure. The preferred method of applying the silver to the iron group metal and to the aluminum base metal is electroplating, although other methods may also be employed such as silver vapor deposition, pressure bonding, or fusion bonding. The clean silver-coated surfaces of the iron group metal and of the aluminum base metal are then placed in contact and heated in a non-oxidizing atmosphere to a temperature which may be in the range of 350° to 500° C. and the two sheets are then pressed between pressure rolls, platens, or other pressure applying means to complete the bond. As it is further disclosed particularly in the said co-pending application Serial No. 579,992, the provision of a silver layer on the surface of the aluminum base metal may be dispensed with and a layer of silver may be provided only on the surface of the iron base metal. Thus, for example, a thin layer of silver may be produced on a steel surface by electrodeposition. It is essential that the silver adhere tightly to the steel, therefore, the surface of the steel must be carefully prepared to receive the silver layer by cleaning, sand blasting, pickling and bright annealing, if necessary. The aluminum, or aluminum base metal must also be carefully cleaned and prepared in order to present a clean and bright metallic surface. In general, the type of surface cleaning usually given to aluminum prior to resistance welding is adequate. The clean silver-coated surface of the steel is now placed in contact with the clean but uncoated surface of the aluminum and both surfaces are heated in a non-oxidizing atmosphere to a temperature in the range of 350° to 525° C. and the two sheets are bonded together by the application of pressure thereto.

I have now discovered that there is a definite inter-relation between the thickness of the silver interlayer and the strength of the bond obtained. More particularly, it has been found, contrary to all expectations, that the strength properties of the bond are improved by reducing the thickness of the silver interlayer. While silver layers having a thickness between 0.0003 and 0.006" provide generally satisfactory bonds, the properties of the bond, such as its strength and fatigue resistance, can be further improved to a very substantial extent by applying a silver layer to at least one of the metals to be bonded, having a thickness of about 0.000025 to about 0.001", the preferred thickness being in the range of about 0.0001". Experience has demonstrated that when employing a relatively thick silver interlayer, the strength of the bond was substantially that of silver, which is a comparatively soft and weak metal, particularly at slightly elevated temperatures. The bond provided by such relatively thick silver interlayers, if it was subjected to heating cycles at temperatures of about 200° C., would frequently deteriorate. This was a disadvantage for certain practical applications of the bimetals made in accordance with the invention, such as for bearing applications, where the operating temperature may be as high as 150° C., or over. It was found that by controlling the thickness of the silver layer within rather close limits, the permanency and the strength of the bond were retained even though the bimetal was exposed to elevated temperatures for long periods of time. A microscopical investigation indicates that during the bonding process several aluminum-silver alloys are being formed, of which in some cases as many as three distinctive layers were identified. In the presence of an excess of silver, it is possible that all stable phases, such as alpha, gamma and delta may coexist. In heating further diffusion occurs and certain silver-aluminum compounds may be formed which are mechanically weak. By eliminating the excess silver, this danger is eliminated, as was demonstrated by actual tests. In addition to increasing the strength of the bond, reduction in the thickness of the silver interlayer has the further important advantage that it results in considerable economy in the use of silver.

Accordingly, it is one of the objects of the invention to provide a novel and improved method of bonding layers of aluminum and steel together by means of a silver interlayer and by the application of heat and pressure to the bonding region.

It is another object of the present invention to provide an improved method of bonding together layers of aluminum and steel by applying a silver coating of controlled thickness to the bonding surface of the steel layer, bringing said silver coating into face to face contact with the bonding surface of the aluminum layer, and effecting a bond therebetween by pressure applied thereto concurrently with heating to suitable temperatures.

Other and further objects and advantages of the invention will become apparent from the following description, taken in conjunction with the accompanying drawing, which is a diagrammatic illustration of a process for making bimetals or overlay metals in accordance with the invention.

Broadly stated, the bonding process embodying the present invention essentially comprises cleaning the surfaces of the strips of aluminum and steel to be bonded together by means of a mechanical, chemical or electrical procedure. A silver layer of critically controlled thickness is deposited upon the bonding surface of the steel strip either directly or on a "strike" first provided thereon, such as a nickel or copper strike. The strips to be bonded together are now heated to appropriate bonding temperatures in a suitable inert or reducing atmosphere. Thereafter, the surfaces of the strips are pressed together to effect the bond, such pressure being preferably produced by means of a pass between a pair of rolls, whereby at the same time a reduction in overall thickness of the bimetal is obtained. Of course, great variations are possible in carrying out the treatments for cleaning, plating, heating and pressing together the strips, such treatments being to a substantial extent determined by the characteristics of the individual metals to be bonded.

In order to give to those skilled in the art a better understanding of the invention, the following illustrative example may be given:

EXAMPLE

*Bonding aluminum and aluminum base alloys to steel and other iron base metals*

A suitable method for producing aluminum clad steel with a cladding on one side or both sides of the steel may comprise the following operations:

The steel is degreased with an organic solvent and is anodically cleaned with a suitable cleaning medium, such as "Anodex." This is followed by rinsing the steel with water and pickling the same anodically in a pickling solution, which may be a solution of orthophosphoric acid in water, with a current density of about 70 to 100 amperes per square foot. After the pickling operation, the steel is again rinsed with deionized water and is transferred into a nickel strike bath for applying a nickel strike thereto. A suitable nickel strike solution may consist of the following ingredients:

| | Grams per liter |
|---|---|
| $NiSO_4 \cdot 7H_2O$ | 202 to 210 |
| $NH_4Cl$ | 33.8 to 48 |
| $H_3BO_3$ | 26 to 37 |
| Dupenol NE, dry | 0.05 to 2 |

The pH of the nickel strike solution is held between 4.6 and 5.2, and the strike may be applied for a period of about three minutes at a current density of about 10 amperes per square foot.

After the nickel strike, the steel is again rinsed with water and after a dip in KCN a silver strike is applied thereto in a bath of silver cyanide and potassium cyanide solution. Immediately after the silver strike has been applied, the pretreated steel is immersed in the silver plating bath. A suitable silver plating bath may contain the following ingredients:

| | Grams per liter |
|---|---|
| Ag CN | 95 to 125 |
| Free KCN | 95 to 125 |
| KOH | 15 to 40 |

A small percentage of a brightener may be added to this bath. The steel is silver-plated for approximately fifty seconds at 45 amperes per square foot and at a temperature of 120° F. Such a plating procedure will produce a silver deposit of a thickness of about 0.0001", which is a preferred silver thickness for the purposes of the present invention.

The aluminum surface may be prepared for the bonding process in the following manner:

The aluminum is first thoroughly degreased with carbon tetrachloride or with some other similar organic solvent, and is cleaned in a special aluminum cleaning solution, such as Enthon "E." The aluminum is then rinsed in water and dipped in a solution of nitric acid and is again rinsed and dried.

The aluminum and steel are then held together by any suitable means, with the silver layer on the steel facing the cleaned surface of the aluminum, and are heated in a non-oxidizing atmosphere or in a reducing atmosphere, such as hydrogen, cracked gas, or cracked ammonia, to a temperature between 350° and 525° C., for example to about 500° C. If the bonding process is a continuous one, heating facilities have to be provided which are capable of raising the temperature of the assembly to the desired bonding temperature at a speed corresponding to the speed of the rolling operation. This may be accomplished by induction heating, torch heating, resistance heating or any other suitable means. If the bonding process is of the batch type, the heated assembly of aluminum on steel may be removed from the furnace and may be passed through a rolling mill effecting a total reduction of 10% to 40%. While in general it is not desirable to expose the heated assembly to air, experiments have shown that short exposures are not harmful. It has been also found that a silver layer of about 0.0001" in thickness is sufficient to protect the steel from oxidizing, when exposed to air for short periods of time.

When it is desired to manufacture aluminum-steel overlay metal on a quantity production scale, it is preferred to carry out the cleaning, plating, preheating and rolling operations continuously. Such a continuous process of making aluminum-steel overlay metal is diagrammatically illustrated in the accompanying drawing.

A strip of steel sheet 10 is unwound from roll 11 and passes through a cleaning and electroplating apparatus 12 which applies a layer of silver to one surface of the steel strip. An aluminum strip 13 is simultaneously unwound from roll 14 and passes through a cleaning apparatus 15 to clean and to prepare at least one of its surfaces. The silver-plated steel strip 10 and the cleaned aluminum strip 13 are then brought together with the silver-plated face of the steel in contact with the cleaned face of the aluminum and led through a hydrogen furnace 16 which heats them to pressure bonding temperature in a hydrogen atmosphere. The contiguous strips emerge from the furnace through a hydrogen chamber 17 and then pass between pressure rolls 18 and 19 which apply sufficient pressure to bond the silver surface of the steel together with the cleaned surface of the aluminum, thus completing the bimetal strip 20 which emerges from the process.

The rolling process may be controlled in such a manner as to provide the desired ratio of thickness between aluminum and steel after a single pass through the mill. If the rolls are kept in good condition, an excellent surface finish may be obtained both on the steel and on the aluminum. In certain cases, however, it may be desirable to use a breakdown mill exclusively for the bonding process and to subject the bimetal to additional cold rolling operations in 2 high, 4 high or cluster mills until it is reduced to the desired dimensions. Experiments have shown that cold reductions exceeding 60% may be applied without affecting the strength of the bond.

As a result of its comparative softness, aluminum will be reduced at a rate higher than steel. Some of the factors affecting the aluminum to steel ratio are the bonding temperature, the friction between rolls and work, the hardness of components at the rolling temperature, the speed of rolling, the original starting ratio, and the total reduction. The ratio, of course, may be readily adjusted to any desired value by appropriate control of any or all of these factors.

Applications of aluminum clad steel are in industrial fields where it is desired to combine the properties of aluminum, such as light weight, good electrical and thermal conductivity, high resistance to corrosion, good frictional characteristics, with the high tensile strength of backing members, such as steel, or other ferrous alloys.

Specific applications of aluminum clad steel prepared in accordance with the principles of the present invention are, for example, bearings, containers for the dairy and chemical industries, light-weight component parts for electrical and mechanical devices, such as steel springs clad with aluminum, and the like. Stainless steel-aluminum overlay metals may be advantageously employed in the manufacture of cooking utensils wherein the aluminum may be clad on one or both sides of the stainless steel. Cooking utensils of this type are greatly superior to conventional utensils of the type wherein copper is clad with stainless steel in that aluminum provides the advantage of light weight in addition to excellent heat conductivity. As the operating temperatures of cooking utensils are relatively high, it is of critical importance to provide silver interlayers of greatly reduced thickness in accordance with the present invention as the bond strength at such temperatures would be greatly reduced by utilizing heavy interlayers.

Heretofore, great difficulties have been experienced in resistance welding aluminum and aluminum alloys, due to the high electrical and thermal conductivity of such materials. The useful life of welding electrodes or tips was rather short when welding aluminum and its alloys, and necessitated frequent replacement of the tips involving a substantial expenditure of time and money. Furthermore, frequently cracks would be produced when resistance welding certain aluminum alloys, particularly when spot welding or seam welding such alloys. In accordance with the principles of the present invention, sheets of aluminum or aluminum alloys may be clad on one or both sides with steel or similar alloys which can be readily welded. Thus, overlay metals may be produced consisting of an aluminum body, constituting 80% of the total thickness, and a cladding of steel on both sides of said body, each constituting 10% of the total thickness. Overlay metals of this improved type combine the advantage of light weight and increased modulus of elasticity with great facility of welding and may be employed in the fabrication of complex structures by conventional resistance welding methods without the difficulties encountered in welding unclad aluminum strips.

What is claimed is:

1. The method of making aluminum-steel overlay metal from layers of aluminum and steel which comprises cleaning the bonding surfaces of the aluminum and steel layers, coating the bonding surface of the steel layer with a layer of silver having a thickness between about 0.000025" and about 0.001", placing said silver coating on the steel layer in contact with the cleaned surface of the aluminum layer, preheating the layers under non-oxidizing conditions to a temperature below the melting point of silver and between about 350° and about 525° C., and applying rolling pressure to said preheated layers to reduce the thickness of the layers and to permanently bond the layers together.

2. The method of making aluminum-steel overlay metal from layers of aluminum and steel which comprises cleaning the bonding surfaces of the aluminum and steel layers, electrodepositing a coating of silver having a thickness between about 0.000025" and about 0.001" on the cleaned surface of the steel layer, bringing said layers together with the silver coating on the steel layer in contact with the cleaned surface of the aluminum layer, preheating the layers under non-oxidizing conditions to a temperature below the melting point of silver and between about 350° and about 525° C., and applying rolling pressure to said preheated layers to cause reduction thereof and to permanently bond the layers together.

3. The method of making aluminum-steel overlay metal from layers of aluminum and steel which comprises cleaning the bonding surfaces of the aluminum and steel layers, electrodepositing a coating of silver having a thickness in the order of about 0.0001" on the cleaned surface of the steel layer, bringing said layers together with the silver coating on the steel layer in contact with the cleaned surface of the aluminum layer, preheating the layers under non-oxidizing conditions to a temperature below the melting point of silver and between about 350° and about 525° C., and applying rolling pressure to said preheated layers to cause reduction thereof and to permanently bond the layers together.

4. The continuous method of making aluminum-steel overlay metal from layers of aluminum and steel which comprises cleaning the bonding surfaces of the aluminum and steel layers, passing the said steel layer through a silver plating bath to electrodeposit on the bonding surface thereof, a coating of silver having a thickness between about 0.000025" and about 0.001", placing said layers together with the silver coating on the steel layer in contact with the cleaned surface of the aluminum layer, preheating the layers in a non-oxidizing atmosphere to a temperature below the melting point of silver and between about 350° and about 525° C., and applying rolling pressure to said preheated layers to reduce the thickness of the layers and to permanently bond the layers together.

FRANZ R. HENSEL.

REFERENCES CITED

The following references are of record in the file of this patent:

UNITED STATES PATENTS

| Number | Name | Date |
|---|---|---|
| 234,736 | Wheeler et al. | Nov. 23, 1880 |
| 757,582 | Wachwitz | Apr. 19, 1904 |
| 1,256,954 | Travers | Feb. 19, 1918 |
| 1,539,577 | Kirschner | May 26, 1925 |
| 2,094,483 | Weder | Sept. 28, 1937 |
| 2,171,040 | Merritt | Aug. 29, 1939 |
| 2,269,523 | Deutsch | Jan. 13, 1942 |
| 2,269,839 | Young | Jan. 13, 1942 |
| 2,277,023 | Steiner | Mar. 17, 1942 |
| 2,289,572 | Underwood | July 14, 1942 |
| 2,294,404 | Hensel | Sept. 1, 1942 |
| 2,317,510 | Barklie | Apr. 27, 1943 |
| 2,366,168 | Bakarian | Jan. 3, 1945 |
| 2,392,917 | Guinee | Jan. 15, 1946 |
| 2,473,712 | Kinney | June 21, 1949 |
| 2,484,118 | Reynolds | Oct. 11, 1949 |

FOREIGN PATENTS

| Number | Country | Date |
|---|---|---|
| 29,577 | Great Britain | 1897 |
| 26,375 | Great Britain | 1903 |
| 545,023 | Great Britain | May 7, 1942 |

OTHER REFERENCES

P. 130, Aviation Pub., by Gardiner Pub. Co., Inc., N. Y., Jan. 17, 1927.

Silver Industry, pub. 1940, pp. 41, 42, 189 and 271.